(12) United States Patent
Sugimoto et al.

(10) Patent No.: US 11,898,863 B2
(45) Date of Patent: Feb. 13, 2024

(54) SERVER, MOBILE SYSTEM, AND RECORDING MEDIUM

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 17/480,688

(22) Filed: Sep. 21, 2021

(65) Prior Publication Data

US 2022/0120577 A1 Apr. 21, 2022

(30) Foreign Application Priority Data

Oct. 15, 2020 (JP) .................. 2020-174020

(51) Int. Cl.
G01C 21/34 (2006.01)
G08G 1/00 (2006.01)
G06Q 50/30 (2012.01)
B60L 58/13 (2019.01)

(52) U.S. Cl.
CPC .......... *G01C 21/3469* (2013.01); *B60L 58/13* (2019.02); *G06Q 50/30* (2013.01); *G08G 1/202* (2013.01); *B60L 2260/52* (2013.01); *B60L 2260/54* (2013.01)

(58) Field of Classification Search
CPC ..... G01C 21/3469; G01C 21/26; B60L 58/13; B60L 2260/52; B60L 2260/54; B60L 53/68; B60L 58/12; B60L 2240/80; B60L 53/14; B60L 53/66; G06Q 50/30; G08G 1/202; Y02T 10/70; Y02T 10/7072; Y02T 90/12; Y02T 90/14; Y02T 90/16
See application file for complete search history.

(56) References Cited

U.S. PATENT DOCUMENTS 8,996,213 B2 3/2015 Ishikawa et al.
2020/0192363 A1* 6/2020 Landy .................. G05D 1/0088

FOREIGN PATENT DOCUMENTS

JP 2013-070515 A 4/2013
JP 2019-219212 A 12/2019

* cited by examiner

*Primary Examiner* — Alan D Hutchinson
(74) *Attorney, Agent, or Firm* — Finnegan, Henderson, Farabow, Garrett & Dunner, LLP

(57) ABSTRACT

A server includes a processor configured to acquire a user's destination, estimate a user's staying time at the destination based on the destination, determine whether to move a moving body used by the user based on the staying time, and control driving of the moving body.

14 Claims, 9 Drawing Sheets

SERVER, MOBILE SYSTEM, AND RECORDING MEDIUM

CROSS-REFERENCE TO RELATED APPLICATION(S)

The present application claims priority to and incorporates by reference the entire contents of Japanese Patent Application No. 2020-174020 filed in Japan on Oct. 15, 2020.

BACKGROUND

The present disclosure relates to a server, a mobile system, and a program.

Japanese Laid-open Patent Publication No. 2013-70515 discloses a technique for predicting a required power amount of a battery needed for a moving body such as an electric vehicle to travel on a planned travelling route to a destination.

SUMMARY

There is a need for providing a server, a mobile system, and a recording medium storing a program capable of performing an operation in consideration of a user's behavior at a destination.

According to an embodiment, a server includes a processor to acquire a user's destination, estimate a user's staying time at the destination based on the destination, determine whether to move a moving body used by the user based on the staying time, and control driving of the moving body.

According to an embodiment, a mobile system includes: a moving body having a rechargeable secondary battery; and a server having a processor to acquire a user's destination, estimate a user's staying time at the destination based on the destination, determine whether to move a moving body used by the user based on the staying time, and control driving of the moving body.

According to an embodiment, a non-transitory computer-readable recording medium storing a program for causing a processor to acquire a user's destination, estimate a user's staying time at the destination based on the destination, determine whether to move a moving body used by the user based on the staying time, and control driving of the moving body.

DETAILED DESCRIPTION

In the related art, it is conceivable that a moving body that can autonomously operate automatically moves to a charging place and is charged with a required power amount by using the technology of Japanese Laid-open Patent Publication No. 2013-70515. However, there is a possibility that a moving body that can autonomously operate automatically moves to a charging place according to a state of charge (SOC) of the moving body, even if a user stays for a short time on account of some business at a destination. Therefore, there is a possibility that the user cannot use the moving body because the moving body is being charged in a case where the user wants to use the moving body again.

Hereinafter, a charging system according to embodiments of the present disclosure will be described with reference to the drawings. The present disclosure is not limited by the following embodiments. In the following description, identical parts are given identical reference signs.

First Embodiment

Overview of Mobile System

Figure 1:
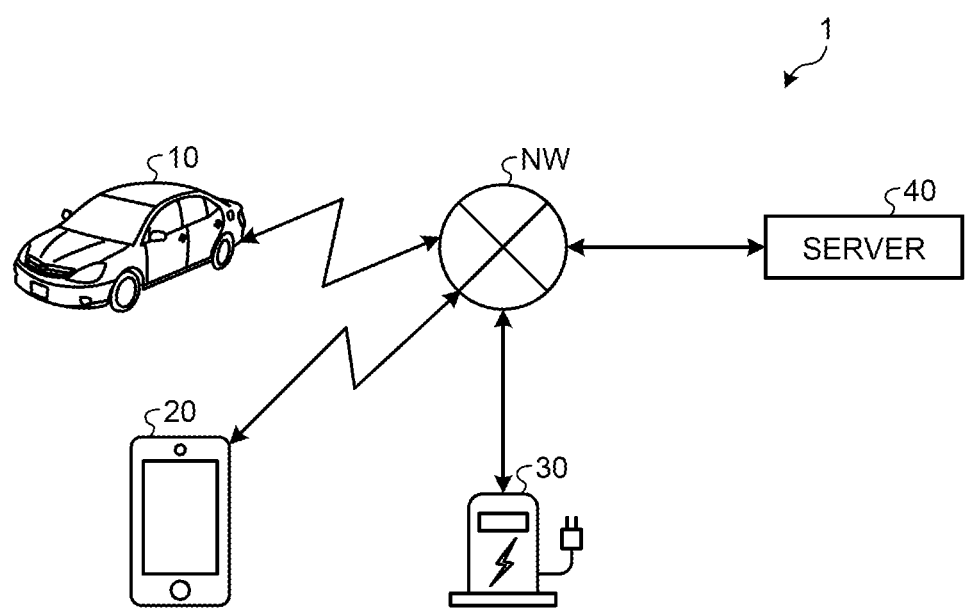
FIG. 1 is a diagram schematically illustrating a configuration of a mobile system according to the first embodiment.

FIG. 1 is a diagram schematically illustrating a configuration of a mobile system according to the first embodiment. The mobile system 1 illustrated in FIG. includes a moving body 10, a communication terminal 20, a charging device 30, and a server 40. The mobile system 1 is configured so that these elements can communicate with one another over a network NW. This network NW is, for example, an Internet network, a mobile phone network, or the like.

Functional Configuration of Moving Body

Figure 2:
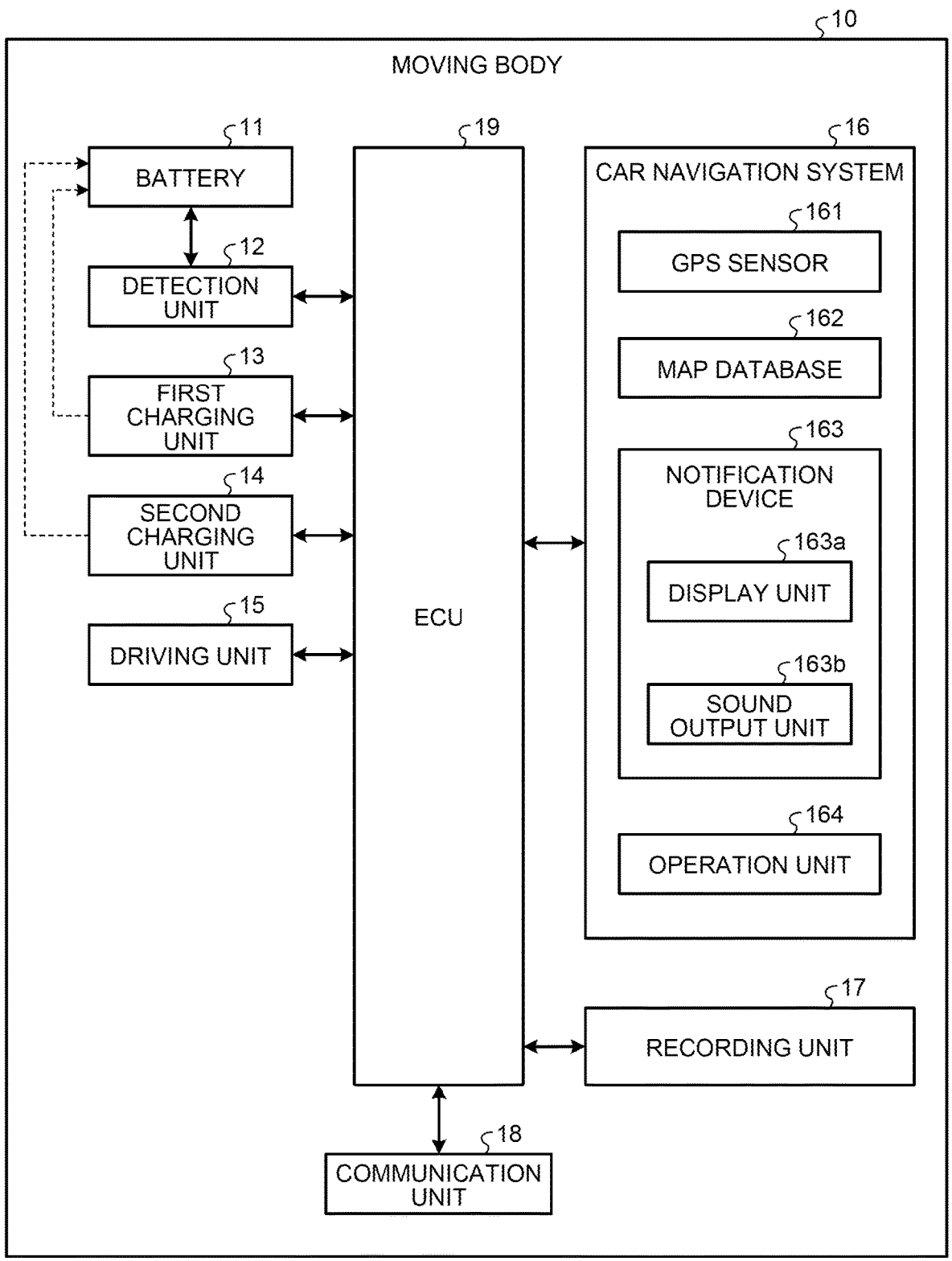
FIG. 2 is a block diagram illustrating a functional configuration of a moving body according to the first embodiment.

First, a functional configuration of the moving body 10 will be described. FIG. 2 is a block diagram illustrating a functional configuration of the moving body 10.

The moving body 10 illustrated in FIG. 2 includes a battery 11, a detection unit 12, a first charging unit 13, a second charging unit 14, a driving unit 15, a car navigation system 16, a recording unit 17, a communication unit 18, and an electronic control unit (ECU) 19. Although a vehicle such as an electric vehicle (EV), a plug-in hybrid vehicle (PHV), or a fuel cell electric vehicle (FCEV) is described as the moving body 10 in the following description, the moving body 10 is not limited to this and can be, for example, a motorcycle equipped with a motor and a battery, an electric two-wheeled vehicle such as a bicycle or a kickboard, a three-wheeled vehicle, a bus, a truck, a ship, or a drone. Further, the moving body 10 can automatically move toward a destination under control of the server 40 or the ECU 19. Of course, a user using the moving body 10 (or a user on the moving body 10) can move the moving body 10 toward a destination desired by the user by operating a steering and others.

The battery 11 is, for example, a rechargeable secondary battery such as a nickel metal hydride battery or a lithium ion battery. The battery 11 stores high-voltage DC power for driving the moving body 10.

The detection unit 12 detects a remaining battery level (SOC), a temperature, a state of health (SOH), a voltage value, and a current value of the battery 11, and outputs a detection result to the ECU 19. The detection unit 12 is constituted by various battery sensors, a temperature sensor, and the like.

The first charging unit 13 is electrically connected to the battery 11 and is electrically connectable to the charging device 30 via the charging port. The first charging unit 13 converts (transforms) external power (DC power) supplied from the charging device 30 into a voltage and power with which the battery 11 can be charged and outputs the power. The first charging unit 13 is constituted by an AC/DC converter, a DC/DC converter, and the like.

The second charging unit 14 is electrically connected to the battery 11, receives power transmitted in a non-contact manner from the charging device 30 described later, converts the received power into a voltage and power with which the battery 11 can be charged, and outputs the power. The second charging unit 14 includes a receiving coil, an LC resonance circuit, a filter circuit, and a rectifier circuit including a capacitor.

The driving unit 15 supplies a driving force to drive wheels of the moving body 10 based on electric power supplied from the battery 11 under control of the ECU 19. The driving unit 15 is constituted by a motor and the like.

The car navigation system 16 includes a global positioning system (GPS) sensor 161, a map database 162, a notification device 163, and an operation unit 164.

The GPS sensor 161 receives signals from a plurality of GPS satellites or transmitting antennas, and calculates a position (longitude and latitude) of the moving body 10 based on the received signals. The GPS sensor 161 is constituted by a GPS receiving sensor and the like. In the embodiment, orientation accuracy of the moving body 10 may be improved by mounting a plurality of GPS sensors 161.

The map database 162 records various map data. The map database 162 is constituted by a recording medium such as a hard disk drive (HDD) or a solid state drive (SSD).

The notification device 163 includes a display unit 163*a* for displaying an image, a map, video, and character information and a sound output unit 163*b* for generating sounds such as voice and alarm sound. The display unit 163*a* is a display such as a liquid crystal display or an organic electro luminescence (EL) display. The sound output unit 163*b* is a speaker or the like.

The operation unit 164 receives user's operation input and outputs signals corresponding to various received operations to the ECU 19. The operation unit 164 is realized by using a touch panel, buttons, switches, a jog dial, and the like.

The car navigation system 16 configured in this way superimposes a current position of the moving body 10 acquired by the GPS sensor 161 on a map corresponding to the map data recorded in the map database 162 and thereby notifies a user of information including a road on which the moving body 10 is currently travelling, a route to a destination, and the like by the display unit 163*a* and the sound output unit 163*b*.

The recording unit 17 records various kinds of information about the moving body 10. The recording unit 17 records, for example, CAN data of the moving body 10 input from the ECU 19 and various programs executed by the ECU 19. The recording unit 17 is constituted by a dynamic random access memory (DRAM), a read only memory (ROM), a flash memory, a hard disk drive (HDD), a solid state drive (SSD), or the like.

The communication unit 18 transmits CAN data and the like to the server 40 through the network NW under control of the ECU 19. The CAN data includes a remaining battery level (SOC) of the battery 11, SOH, and the like. The communication unit 18 is constituted by a communication module or the like capable of transmitting and receiving various kinds of information.

The ECU 19 is constituted by a memory and a processor having hardware such as a central processing unit (CPU). The ECU 19 controls each unit of the moving body 10. The ECU 19 moves the moving body 10 to the charging device 30 or a predetermined place by controlling the driving unit 15 in accordance with a signal and an instruction transmitted from the server 40 via the communication unit 18, the position of the moving body 10 detected by the car navigation system 16, and the like.

Functional configuration of communication terminal

Figure 3:
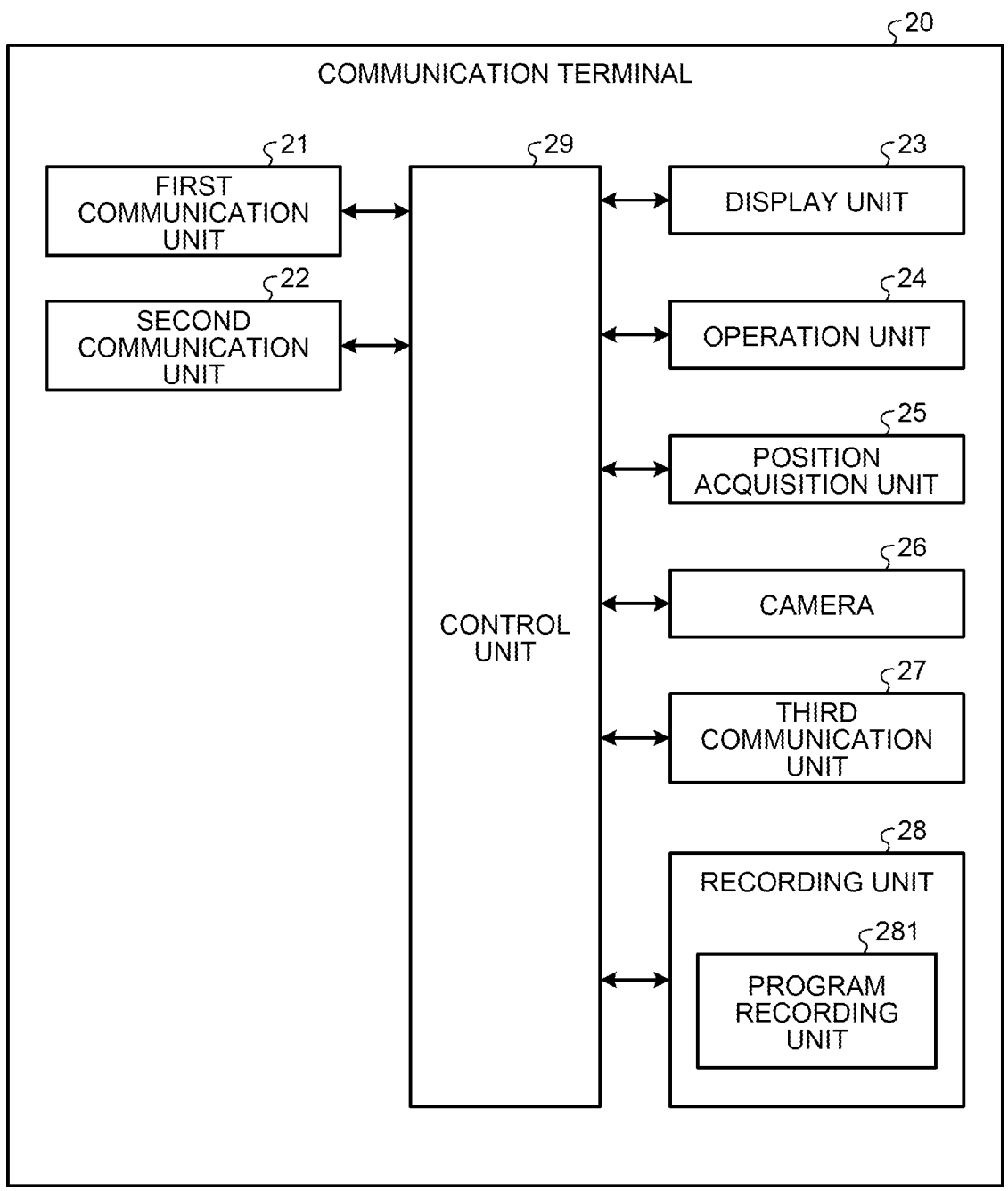
FIG. 3 is a block diagram illustrating a functional configuration of a communication terminal according to the first embodiment.

Next, a functional configuration of the communication terminal 20 will be described. FIG. 3 is a block diagram illustrating the functional configuration of the communication terminal 20.

The communication terminal 20 illustrated in FIG. 3 includes a first communication unit 21, a second communication unit 22, a display unit 23, an operation unit 24, a position acquisition unit 25, a camera 26, a third communication unit 27, a recording unit 28, and a control unit 29. Although it is assumed that the communication terminal 20 is a mobile phone in the following description, this is not restrictive, and the communication terminal 20 can be, for example, a tablet terminal or a wearable terminal.

The first communication unit 21 receives various kinds of information from the moving body 10 under control of the control unit 29 and outputs the received various kinds of information to the control unit 29. The first communication unit 21 is, for example, a communication module that supports Bluetooth (registered trademark) or the like.

The second communication unit 22 receives various kinds of information from the moving body 10 under control of the control unit 29 and outputs the received various kinds of information to the control unit 29. The second communication unit 22 is a communication module that supports Wi-Fi (registered trademark) or the like.

The display unit 23 displays various kinds of information under control of the control unit 29. The display unit 23 is a display panel such as a liquid crystal display or an organic electro luminescence (EL) display.

The operation unit 24 receives entry of various user's operations and outputs signals corresponding to the received various operations to the control unit 29. The operation unit 24 is constituted by a touch panel, switches, buttons, and the like.

The position acquisition unit 25 acquires a position of the communication terminal 20 and outputs the acquired position to the control unit 29. The position acquisition unit 25 is realized, for example, by using a plurality of GPS receiving sensors.

The camera 26 generates image data by photographing a subject under control of the control unit 29 and outputs this image data to the control unit 29. The camera 26 is realized by one or more optical systems and a charge coupled device (CCD) or complementary metal oxide semiconductor (CMOS) image sensor that generates image data by capturing an image of a subject imaged by the optical systems.

The third communication unit 27 transmits destination information on a destination set by using the operation unit 24 by the user through communication with the server 40 over the network NW under control of the control unit 29. The third communication unit 27 is a communication module that supports communication standards using a mobile phone line such as a 4th generation mobile communication system (4G) and a 5th generation mobile communication system (5G).

The recording unit 28 records various kinds of information about the communication terminal 20 and various programs executed by the communication terminal 20. The recording unit 28 is realized by a DRAM, a ROM, a flash memory, an SSD, a memory card, or the like.

The control unit 29 is constituted by a memory and a processor having hardware such as a CPU. The control unit 29 controls each unit of the communication terminal 20.

Functional Configuration of Charging Device

Figure 4:
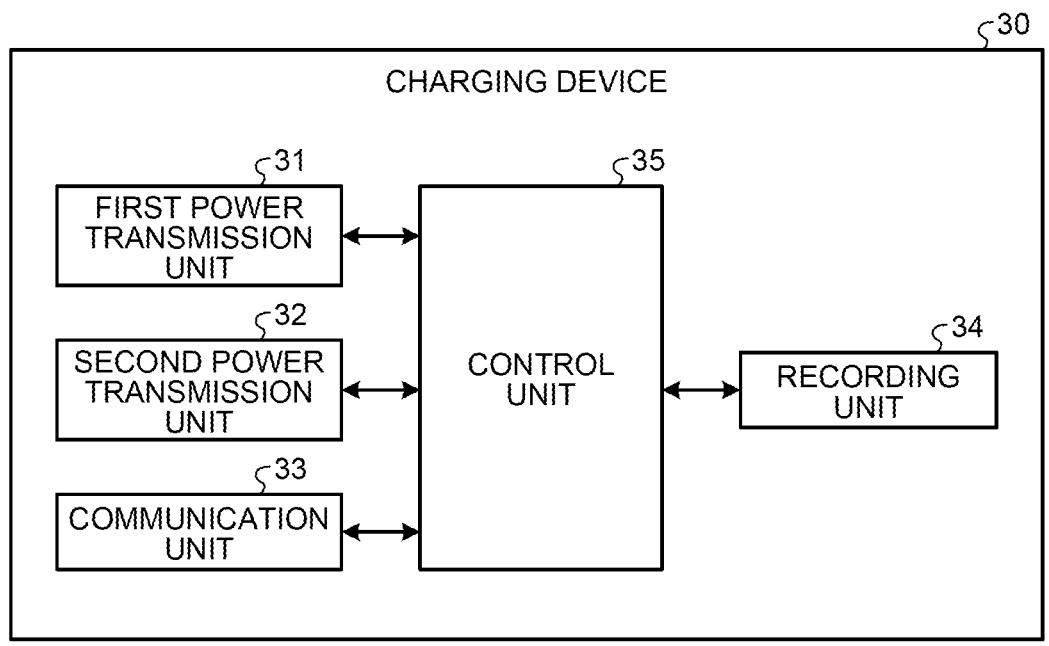
FIG. 4 is a block diagram illustrating a functional configuration of a charging device according to the first embodiment.

Next, a functional configuration of the charging device 30 will be described. FIG. 4 is a block diagram illustrating the functional configuration of the charging device 30.

The charging device 30 illustrated in FIG. 4 includes a first power transmission unit 31, a second power transmission unit 32, a communication unit 33, a recording unit 34, and a control unit 35.

The first power transmission unit 31 is connected to the first charging unit 13 of the moving body 10 and converts an alternating current of a predetermined voltage value (for example, 6600 V) supplied from an external AC power source into a direct current of a predetermined voltage value (for example, 200 V) and supplies the direct current to the first charging unit 13 (DC charging). The first power transmission unit 31 includes a connector that is connectable to the first charging unit 13 of the moving body 10, a cable that transfers power to the connector, an AC/DC converter, and the like. The first power transmission unit 31 may be configured to supply an alternating current to the first charging unit 13 (AC charging).

The second power transmission unit 32 converts an alternating current of a predetermined voltage value (for example, 6600 V) supplied from an external AC power source into a predetermined voltage value and transmits the power to the second charging unit 14 of the moving body 10 in a non-contact manner through a magnetic field (wireless AC charging). The second power transmission unit 32 includes a transmission coil, an AC/DC converter, an inverter, an LC resonance circuit, a filter circuit, a rectifier circuit including a capacitor, and the like. The power feeding method may be either a magnetic field coupling method or an electric field coupling method.

The communication unit 33 transmits and receives various kinds of information through communication with the moving body 10, the communication terminal 20, and the server 40 over the network NW under control of the control unit 35. The communication unit 33 is, for example, a communication module.

The recording unit 34 records various kinds of information about the charging device 30. The recording unit 34 is, for example, a DRAM, a ROM, a flash memory, or an SSD.

The control unit 35 is constituted by a memory and a processor having hardware such as a CPU. The control unit 35 controls each unit of the charging device 30.

Functional Configuration of Server

Figure 5:
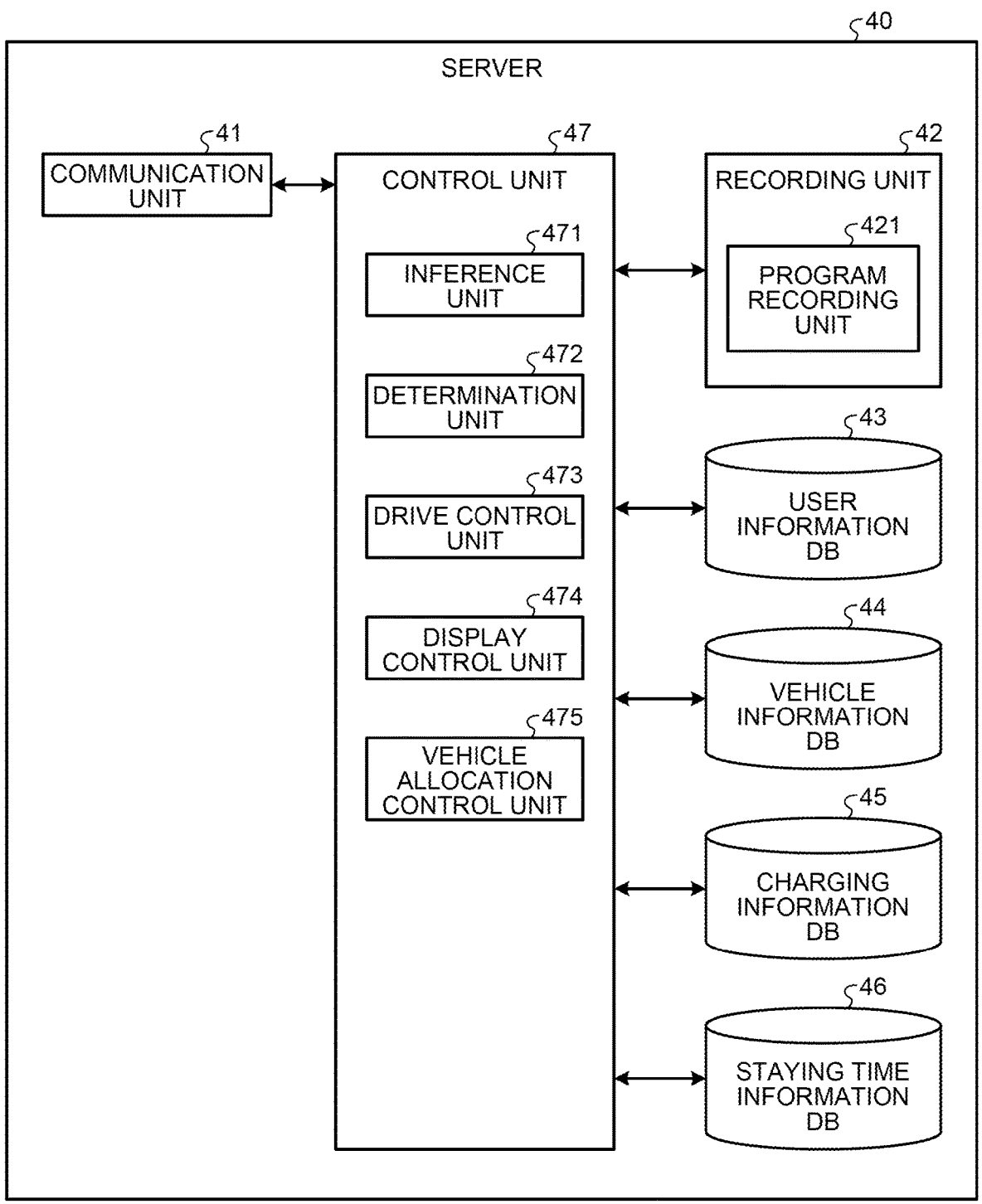
FIG. 5 is a block diagram illustrating a functional configuration of a server according to the first embodiment.

Next, a functional configuration of the server 40 will be described. FIG. 5 is a block diagram illustrating the functional configuration of the server 40.

The server 40 illustrated in FIG. 5 includes a communication unit 41, a recording unit 42, a user information database 43 (hereinafter referred to as "user information DB 43"), a vehicle information database 44 (hereinafter referred to as "vehicle information DB 44"), a charging information database 45 (hereinafter referred to as "charging information DB 45"), a staying time information database 46 (hereinafter referred to as "staying time information DB 46"), and a control unit 47.

The communication unit 41 communicates with the moving body 10, the communication terminal 20, and the charging device 30 over the network NW under control of the control unit 47 to transmit and receive various kinds of information. The communication unit 41 is, for example, a communication module.

The recording unit 42 records various kinds of information about the server 40. Further, the recording unit 42 has a program recording unit 421 that records various programs executed by the server 40. The recording unit 42 is realized by using a DRAM, a ROM, a flash memory, an SSD, an HDD, a memory card, or the like.

The user information DB 43 records user information in which terminal information for identifying the communication terminal 20 possessed by a user and user identification information for identifying the user are associated with each other. The terminal information includes a device address, a telephone number, an e-mail address, and the like. The user identification information includes a user's name, address, and date of birth and user's action history based on position information of the user's communication terminal 20. The action history may include user's purchase history based on electronic money registered in the user's communication terminal 20. The user information DB 43 is realized, for example, by an HDD or an SSD.

The vehicle information DB 44 records vehicle information in which vehicle identification information for identifying the moving body 10, current state information of the moving body 10, and current position information of the moving body 10 are associated with one another. The vehicle identification information includes vehicle model name, model year, owner, and the like of the moving body 10. The state information includes a remaining battery level of the battery 11, CAN data, and the like of the moving body 10. The vehicle information DB 44 is realized, for example, by an HDD or an SSD.

The charging information DB 45 records charging information in which charging identification information for identifying the charging device 30, charging status information indicating a current charging status of the charging device 30, and installation information indicating an installation place of the charging device 30 are associated with one another. The charging identification information includes a charging method of the charging device 30 (for example, a normal charging method (single-phase AC200 V or 100 V) or a quick charging method), a shape of a charging connector, a device address, and the like. The charging status information includes whether the moving body 10 is currently charged by the charging device 30, a scheduled charging completion time of the battery 11 of the moving body 10, a charging status of the battery of the moving body 10, and the like. The charging information DB 45 is realized, for example, by an HDD or an SSD.

The staying time information DB 46 records staying time information in which facility information on a facility and an average staying time of persons staying at this facility are associated with each other. The facility information is a type of facility (for example, convenience store or hospital), position information of the facility, a store name, and the like. The staying time information DB 46 is realized, for example, by an HDD or an SSD.

The control unit 47 is constituted by a memory and a processor having hardware such as a CPU, a field-programmable gate array (FPGA), and a graphics processing unit (GPU). The control unit 47 controls each unit of the server 40. The control unit 47 includes an inference unit 471, a determination unit 472, a drive control unit 473, a display control unit 474, and a vehicle allocation control unit 475. In the first embodiment, the control unit 47 functions as a processor.

The inference unit 471 acquires a user's destination via the communication unit 41 and estimates a staying time at the user's destination based on the acquired destination. Specifically, the inference unit 471 acquires a destination set by the user on the communication terminal 20 or the car navigation system 16 of the moving body 10 via the communication unit 41. Then, the inference unit 471 estimates a user's staying time at the destination based on the user's destination, behavior history included in the user information recorded in the user information DB 43, and the staying time information recorded in the staying time information DB 46. For example, the inference unit 471 estimates that the user's staying time is 3 minutes in a case where the type of user's destination is a convenience store, and estimates that the user's staying time is 1 hour in a case where the type of user's destination is a hospital. The inference unit 471 may read a learned model recorded in the program recording unit 421, input a user's destination and the type of destination as input data to the read learned model, and output a staying time as output data. This learned model is generated by using, for example, a deep neural network (DNN) as machine learning. The type of DNN network may be any type that can be used by the inference unit 471. Specifically, the type of machine learning is not limited in particular, for example, as long as teacher data and learning data in which a facility and staying times of persons at the facility are associated are prepared and input to a calculation model based on a multi-layer neural network. Further, as a machine learning method, a method based on the DNN of a multi-layer neural network such as a convolutional neural network (CNN) or 3D-CNN may be used.

The determination unit 472 determines whether the moving body 10 used by the user can be moved based on the staying time at the user's destination estimated by the inference unit 471. Specifically, the determination unit 472 determines whether the moving body 10 used by the user can be moved by determining whether the user's staying time at the destination estimated by the inference unit 471 is within a predetermined time. The predetermined time is, for example, 3 minutes to 5 minutes. The predetermined time can be changed as appropriate.

The drive control unit 473 controls driving of the moving body 10 used by the user based on the user's staying time at the destination estimated by the inference unit 471 via the communication unit 41 and the network NW. Specifically, the drive control unit 473 controls driving of the moving body 10 based on a result of the determination by the determination unit 472 as to whether the moving body 10 used by the user can be moved. More specifically, in a case where the determination unit 472 determines that the user's staying time at the destination is within the predetermined time, the drive control unit 473 causes the moving body 10 to wait at the user's destination after the moving body 10 arrives at the user's destination. In this case, the drive control unit 473 transmits a signal instructing the moving body 10 to wait at the destination to the moving body 10. In a case where the determination unit 472 determines that the user's staying time at the destination is not within the predetermined time, the drive control unit 473 moves the moving body 10 to a charging place where the charging device 30 is installed after the moving body 10 arrives at the user's destination. In this case, the drive control unit 473 generates a signal for moving the moving body 10 to the charging place based on current position information of the moving body 10 and the charging information recorded in the charging information DB 45 and transmits this signal to the moving body 10. This signal includes position information on a position in which the charging device 30 capable of charging the moving body 10 is installed, a route to the charging place, and the like.

In a case where the moving body 10 is moved to the charging place, the display control unit 474 outputs information indicating that the moving body 10 used by the user has been moved to the charging place to the communication terminal 20 possessed by the user.

In a case where the moving body 10 is moved from the destination to the charging place, the vehicle allocation control unit 475 dispatches another moving body 10 to the destination. Specifically, the vehicle allocation control unit 475 dispatches another moving body 10 located close to the destination to the destination based on the vehicle information recorded in the vehicle information DB 44 and the position information of the destination. For example, the vehicle allocation control unit 475 dispatches another moving body 10 located close to the destination to the destination by transmitting a signal including the position information of the destination and a route to the destination to the other moving body 10 based on the vehicle information recorded in the vehicle information DB 44 and the position information of the destination.

Processing of Server

Figure 6:
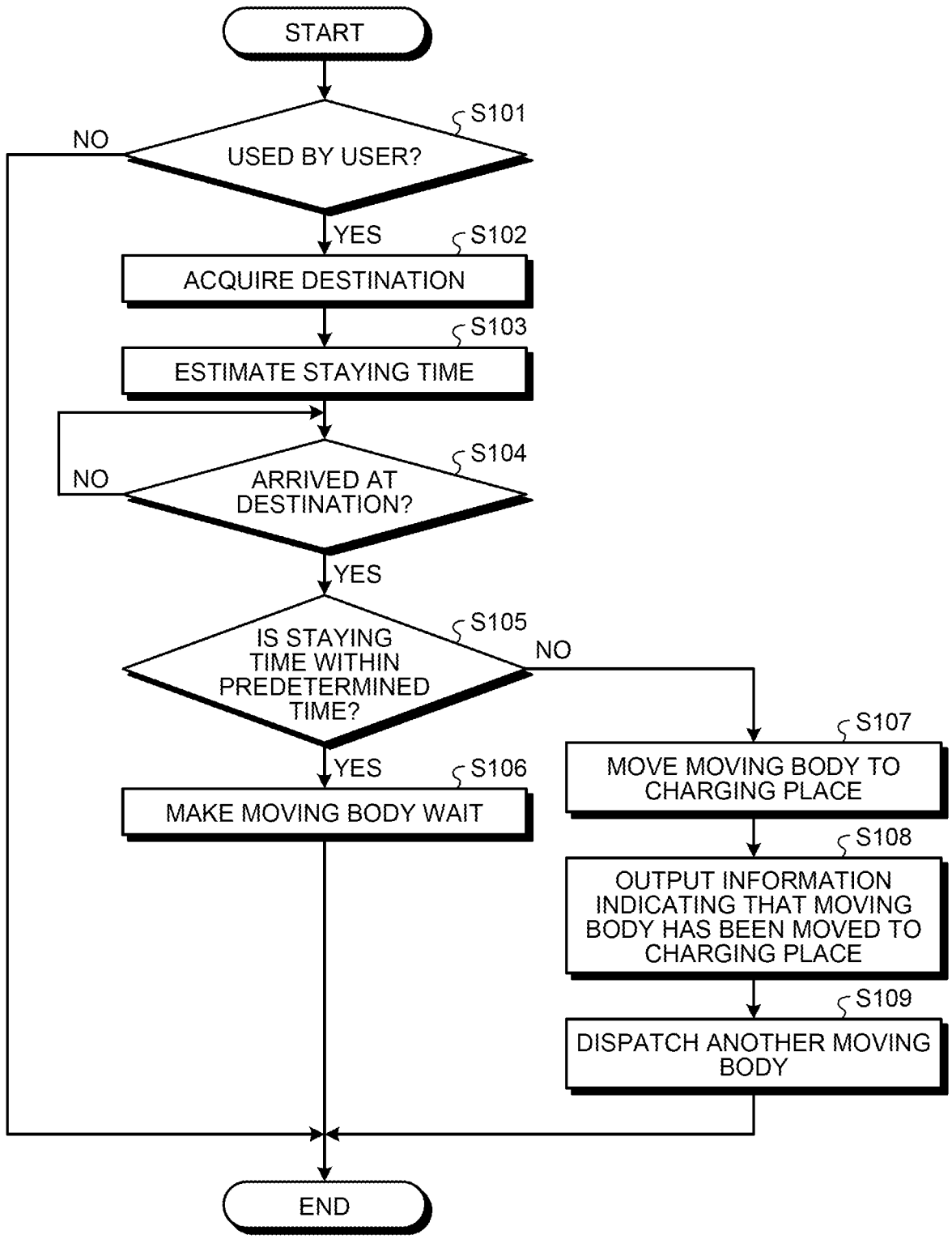
FIG. 6 is a flowchart illustrating an outline of processing executed by the server according to the first embodiment.

Next, processing executed by the server 40 will be described. FIG. 6 is a flowchart illustrating an outline of the processing executed by the server 40.

As illustrated in FIG. 6, the determination unit 472 determines whether a user has used the moving body 10 (step S101). Specifically, the determination unit 472 acquires position information of the communication terminal 20 owned by the user from the position acquisition unit 25 of the communication terminal 20 and the position information of the moving body 10 from the car navigation system 16 of the moving body 10 and determines whether the user has used the moving body 10 based on these two pieces of position information. For example, the determination unit 472 determines whether the position information of the communication terminal 20 is within a predetermined range including the position information of the moving body 10, and determines that the user has used the moving body 10 in a case where the position information of the communication terminal 20 is within the predetermined range including the position information of the moving body 10. Meanwhile, the determination unit 472 determines that the user is not using the moving body 10 in a case where the position information of the communication terminal 20 is not within the predetermined range including the position information of the moving body 10. The determination unit 472 may acquire CAN data of the moving body 10 via the communication unit 41 and the network NW and determine whether the user has used the moving body 10 based on the CAN data. In this case, the determination unit 472 determines whether an ignition switch or a power switch of the moving body 10 included in the CAN data is in an ON state and determines that the user has used the moving body 10 in a case where the ignition switch or the power switch is in an ON state. In a case where the determination unit 472 determines that the user has used the moving body 10 (step S101: Yes), the server 40 proceeds to step S102, which will be described later. Meanwhile, in a case where the determination unit 472 determines that the user is not using the moving body 10 (step S101: No), the server 40 finishes this processing.

In step S102, the inference unit 471 acquires a user's destination. Specifically, the control unit 47 acquires, as the user's destination, a destination of the moving body 10 set in the moving body 10 by the user by operating the operation unit 24 of the communication terminal 20 via the communication unit 41 and the network NW. The inference unit 471 may acquire, as the user's destination, a destination set in the car navigation system 16 of the moving body 10 via the communication unit 41 and the network NW. Of course, the inference unit 471 may acquire, as the user's destination, a destination transmitted by the user to the server 40 by using the communication terminal 20.

Subsequently, the inference unit 471 estimates a user's staying time at the destination based on the user's destination (step S103). Specifically, the inference unit 471 estimates a user's staying time at the destination based on the user's destination, behavior history included in the user information recorded in the user information DB 43, and the staying time information recorded in the staying time information DB 46. The inference unit 471 may read a learned model recorded in the program recording unit 421, input a user's destination and the type of destination as input data to the read learned model, and output a staying time as output data.

Subsequently, the determination unit 472 determines whether the moving body 10 has arrived at the destination (step S104). Specifically, the determination unit 472 acquires position information of the moving body 10 via the communication unit 41 and the network NW, determines whether this position information and position information of the destination are within a predetermined range, and, in a case where these pieces of position information are within the predetermined range, determines that the moving body 10 has arrived at the destination. Meanwhile, the determination unit 472 determines that the moving body 10 has not arrived at the destination in a case where the position information of the moving body 10 and the position information of the destination are not within the predetermined range. In a case where the determination unit 472 determines that the moving body 10 has arrived at the destination (step S104: Yes), the server 40 proceeds to step S105, which will be described later. Meanwhile, in a case where the determination unit 472 determines that the moving body 10 has not arrived at the destination (step S104: No), the determination unit 472 continues this determination.

In step S105, the determination unit 472 determines whether the user's staying time is within a predetermined time as whether the moving body 10 used by the user can be moved. The predetermined time is, for example, about 3 minutes. Of course, the predetermined time can be changed as appropriate. In a case where the determination unit 472 determines that the user's staying time is within the predetermined time (step S105: Yes), the server 40 proceeds to step S106, which will be described later. Meanwhile, in a case where the determination unit 472 determines that the user's staying time is not within the predetermined time (step S105: No), the server 40 proceeds to step S107, which will be described later.

In step S106, the drive control unit 473 makes the moving body 10 wait at the destination. Specifically, the drive control unit 473 makes the moving body 10 wait at the destination by transmitting, to the moving body 10, a signal for making the moving body 10 wait at the destination via the communication unit 41 and the network NW and thereby controlling the ECU 19 of the moving body 10. Further, in a case where the destination has a predetermined parking lot or a designated parking place and the user gets off the moving body 10 at a different place from the parking place of the destination, the drive control unit 473 may move the moving body 10 from the place where the user got off the moving body 10 to the predetermined parking lot or the designated parking place by controlling the ECU 19. The display control unit 474 may transmit information indicating that the moving body 10 has been moved to the parking place to the communication terminal 20 of the user through the communication unit 41 and the network NW. After step S106, the server 40 finishes this processing.

In step S107, the drive control unit 473 moves the moving body 10 to the charging place where the charging device 30 is installed by controlling the ECU 19 of the moving body 10 via the communication unit 41 and the network NW. In this case, the drive control unit 473 generates a signal including position information of the charging place and a route to the charging place to the moving body 10 based on the current position information of the moving body 10 and the charging information recorded in the charging information DB 45 and transmits this signal to the moving body 10. The ECU 19 drives the driving unit 15 according to the signal transmitted from the server 40, and thus the moving body 10 can move to the charging place. Although the drive control unit 473 moves the moving body 10 to the charging place, this is not restrictive, and the drive control unit 473 may cause the moving body 10 to travel on a road in which the charging device 30 capable of non-contact power supply is embedded, for example.

Figure 7:
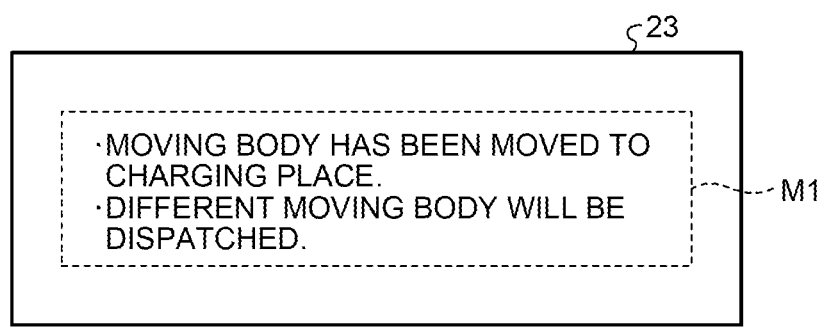
FIG. 7 is a diagram illustrating an example of an image displayed by the communication terminal according to the first embodiment.

Subsequently, the display control unit 474 transmits information indicating that the moving body 10 has been moved to the charging place to the user's communication terminal 20 over the network NW (step S108). Specifically, as illustrated in FIG. 7, the communication terminal 20 displays information M1 received from the server 40 indicating that the moving body 10 has been moved to the charging place on the display unit 23. This allows the user to grasp that the moving body 10 used to the destination has moved to the charging place. Further, the user can know that another moving body 10 has been dispatched.

Then, the vehicle allocation control unit 475 dispatches another moving body 10 to the place (destination) where the user got off the moving body 10 over the network NW (step S109). Specifically, the vehicle allocation control unit 475 dispatches another moving body 10 located close to the destination to the destination based on the vehicle information recorded in the vehicle information DB 44 and the position information of the destination. After step S109, the server 40 finishes this processing.

According to the first embodiment described above, the inference unit 471 estimates a user's staying time at a destination based on the user's destination, and the drive control unit 473 determines whether the moving body 10 used by the user can be moved based on the staying time estimated by the inference unit 471 and controls driving of the moving body 10, and therefore the moving body 10 can be operated in consideration of a user's behavior at the destination.

Further, according to the first embodiment, in a case where the determination unit 472 determines that the user's staying time at the destination is within a predetermined time, the drive control unit 473 makes the moving body 10 wait at the destination after the moving body 10 arrives at the destination. Therefore, in a case where the user stays at the destination for a short time, the user can immediately use the moving body 10 because the moving body 10 is waiting at the destination.

Further, according to the first embodiment, in a case where the determination unit 472 determines that the user's staying time at the destination is not within the predetermined time, the drive control unit 473 moves the moving body 10 to the charging place where the charging device 30 is installed after the moving body 10 arrives at the destination. Therefore, the moving body 10 can be efficiently charged in a situation where the user is not using the moving body 10.

Further, according to the first embodiment, in a case where the drive control unit 473 moves the moving body 10 to the charging place where the charging device 30 is installed, the display control unit 474 outputs information indicating that the moving body 10 has been moved to the charging place to the communication terminal 20 possessed by the user. This allows the user to grasp that the moving body 10 used to the destination has moved to the charging place.

Further, according to the first embodiment, in a case where the drive control unit 473 moves the moving body 10 to the charging place where the charging device 30 is installed, the vehicle allocation control unit 475 dispatches another moving body 10 at the destination. Therefore, the user can use another moving body 10 at a timing when the user finishes what he or she has to do at the destination.

Second Embodiment

Next, the second embodiment will be described. In the second embodiment, it is determined whether to wait in consideration of a user's next destination after arrival at a destination, and a moving body 10 waits or is charged in accordance with a result of the determination. Processing executed by a server according to the second embodiment will be described below. Constituent elements identical to those of the mobile system 1 according to the first embodiment are given identical reference signs, and detailed description thereof will be omitted.

Processing of Server

Figure 8:
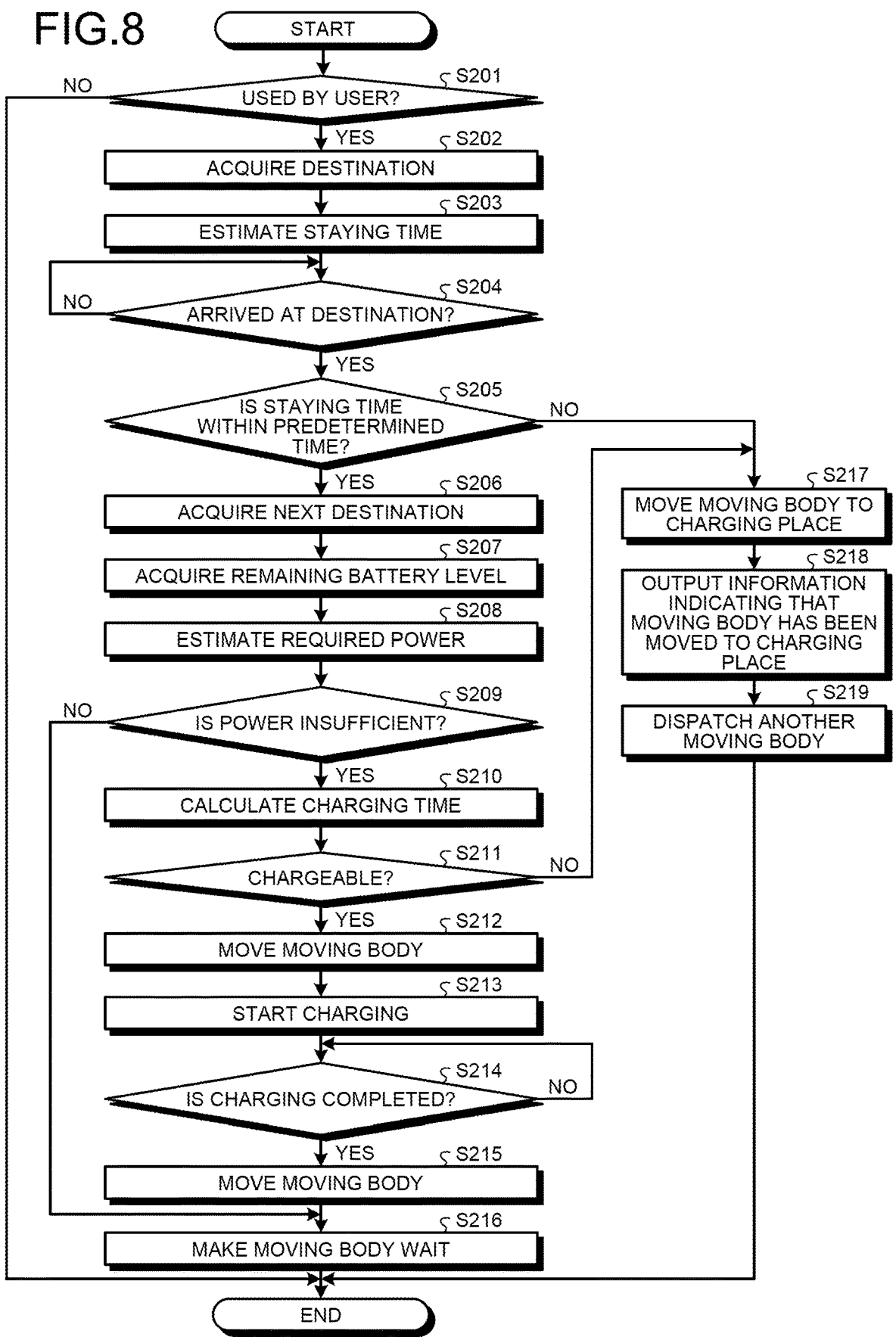
FIG. 8 is a flowchart illustrating an outline of processing executed by a server according to the second embodiment.

FIG. 8 is a flowchart illustrating an outline of processing executed by the server 40 according to the second embodiment. Steps S201 to S205 in FIG. 8 correspond to steps S101 to S105 in FIG. 6, respectively.

In step S206, an inference unit 471 acquires a user's next destination. Specifically, the inference unit 471 acquires the next destination of the moving body 10 set by the user by operating an operation unit 24 of a communication terminal 20 via a communication unit 41 and a network NW.

Subsequently, the inference unit 471 acquires a remaining battery level of a battery 11 of the moving body 10 over the network NW (step S207).

Then, the inference unit 471 estimates power required by the moving body 10 based on a current location (first destination) of the moving body 10, the next destination, and a travelling route of the moving body 10 to the next destination (step S208). In this case, the inference unit 471 may estimate the power required by the moving body 10 in consideration of a congestion status to the travelling route.

Subsequently, the determination unit 472 determines whether the remaining battery level of the moving body 10 estimated by the inference unit 471 is insufficient for travelling to the next destination (step S209). In a case where the determination unit 472 determines that the remaining battery level of the moving body 10 is insufficient for travelling to the next destination (step S209: Yes), the server 40 proceeds to step S210, which will be described later. Meanwhile, in a case where the determination unit 472 determines that the remaining battery level of the moving body 10 is not insufficient for travelling to the next destination (step S209: No), the server 40 proceeds to step S216, which will be described later.

In step S210, the inference unit 471 calculates a charging time for the charging device 30 to charge the moving body 10 based on a remaining battery level of the battery 11 of the moving body 10 and the required power to the next destination. In this case, the inference unit 471 calculates the charging time based on a charging method of the charging device 30 at the charging place included in the charging information recorded in the charging information DB 45 and a reciprocating travelling time of the moving body 10 to the place where the charging device 30 is installed.

Subsequently, the determination unit 472 determines whether the moving body 10 can be charged within the user's staying time at the destination based on the charging time calculated in step S210 (step S211). In a case where the determination unit 472 determines that the moving body 10 can be charged within the user's staying time at the destination (step S211: Yes), the server 40 proceeds to step S212, which will be described later. Meanwhile, in a case where the determination unit 472 determines that the moving body 10 cannot be charged within the user's staying time at the destination (step S211: No), the server 40 proceeds to step S217, which will be described later.

In step S212, the drive control unit 473 moves the moving body 10 to the charging place where the charging device 30 is installed by controlling the ECU 19 of the moving body 10 via the communication unit 41 and the network NW.

Subsequently, the control unit 47 starts charging the moving body 10 by controlling the charging device 30 via the communication unit 41 and the network NW (step S213), and when the charging of the moving body 10 is completed (step S214: Yes), the server 40 proceeds to step S215, which will be described later. Meanwhile, in a case where the charging of the moving body 10 is not completed (step S214: No), the server 40 performs the determination process in step S214 until the charging of the battery 11 of the moving body 10 is completed.

In step S215, the drive control unit 473 moves the moving body 10 to the place where the user got off (the first destination) by controlling the ECU 19 of the moving body 10 via the communication unit 41 and the network NW.

Subsequently, the drive control unit 473 makes the moving body 10 wait at the destination (step S216). After step S216, the server 40 finishes this processing.

Steps S217 to S219 correspond to steps S107 to 5109 in FIG. 6, respectively. After step S219, the server 40 finishes this processing.

According to the second embodiment described above, the inference unit 471 acquires a remaining battery level of the battery 11 of the moving body 10 and a user's next destination, and estimates required power based on the acquired destination and next destination. Then, the determination unit 472 determines whether power of the battery 11 of the moving body 10 is insufficient based on the remaining battery level of the battery 11 of the moving body 10 and the required power estimated by the inference unit 471, and determines, in a case where the power of the battery 11 of the moving body 10 is insufficient, whether the moving body 10 can be charged to the required power at a charging place within a user's staying time at the destination. Then, in a case where the determination unit 472 determines that the moving body 10 can be charged at the charging place to the required power for travelling to the next destination within the user's staying time at the destination, the drive control unit 473 moves the moving body 10 to the charging place to charge the moving body 10, moves the moving body 10 to the destination within the user' staying time at the destination, and makes the moving body 10 wait at the destination. This allows the user to use the moving body 10 that has been charged with power necessary for travelling to the next destination, thereby avoiding a time loss due to the charging time of the moving body 10.

Further, according to the second embodiment, in a case where the determination unit 472 determines that the battery 11 of the moving body 10 cannot be charged to the required power at the charging place within the user's staying time at the destination, the vehicle allocation control unit 475 dispatches another moving body 10 to the destination. This allows the user to use another moving body 10 that has been charged with the required power necessary for travelling to the next destination at a timing when the user finishes what he or she has to do at the destination.

Third Embodiment

Next, the third embodiment will be described. A mobile system according to the third embodiment is different in configuration of a moving body 10 from the first and second embodiments. Specifically, although the server 40 determines whether to make the moving body 10 wait according to a user's staying time at a destination in the first and second embodiments, an ECU of the moving body 10 determines whether to make the moving body 10 wait according to a user's staying time at a destination in the third embodiment. Therefore, the following describes a functional configuration of the moving body according to the third embodiment. In the following description, constituent elements identical to those of the mobile system 1 according to the first and second embodiments are given identical reference signs, and detailed description thereof will be omitted.

Configuration of Moving Body

Figure 9:
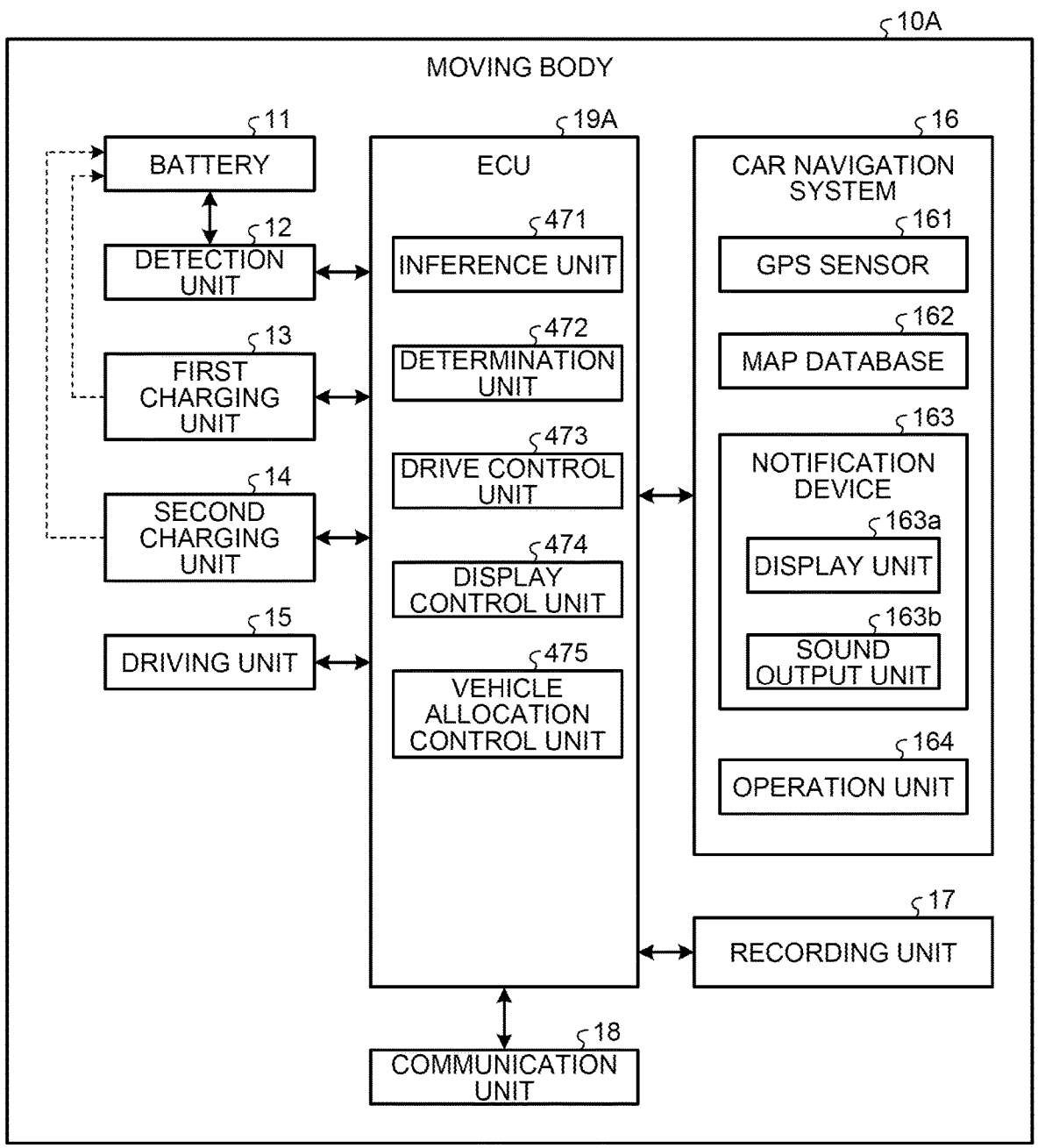
FIG. 9 is a block diagram illustrating a functional configuration of a moving body according to the third embodiment.

FIG. 9 is a block diagram illustrating a functional configuration of a moving body according to the third embodiment. The moving body 10A illustrated in FIG. 9 includes an ECU 19A instead of the ECU 19 of the moving body 10 according to the first embodiment.

The ECU 19A includes a memory and a processor having hardware such as a CPU. The ECU 19A controls each unit of the moving body 10A. The ECU 19A has similar functions to the control unit 47 of the server 40, and has an inference unit 471, a determination unit 472, a drive control unit 473, a display control unit 474, and a vehicle allocation control unit 475.

The moving body 10A configured in this way performs similar processing to the processing executed by the server 40 described in the first and second embodiments. In this case, in the moving body 10A, the inference unit 471 acquires staying time information from the server 40 through communication with the server 40 via the communication unit 18 and estimates a user's staying time at a destination based on the acquired staying time information. Then, the determination unit 472 determines whether the user's staying time is within a predetermined time. Subsequently, the drive control unit 473 controls driving of the moving body 10A at the destination based on a result of the determination of the determination unit 472. For example, the drive control unit 473 makes the moving body 10A wait at the user's destination or moves the moving body 10 to a charging place where a charging device 30 is installed by driving a driving unit 15. In this case, the display control unit 474 outputs information indicating that the moving body 10A has been moved to the charging place to a communication terminal 20 possessed by the user. Further, the vehicle allocation control unit 475 dispatches another moving body 10A to the destination by performing vehicle-to-vehicle communication. Of course, the vehicle allocation control unit 475 may dispatch another moving body 10A to the destination via the server 40.

According to the third embodiment described above, the moving body 10A can be operated in consideration of a user's behavior at a destination, as in the first embodiment.

Other Embodiments

Further, in the mobile systems according to the first to third embodiments, "unit" can be read as "circuit" or the like. For example, the control unit can be read as a control circuit.

The program to be executed by the mobile systems according to the first to third embodiments is offered as a file data in an installable format or an executable format by being recorded in a computer-readable recording medium such as a CD-ROM, a CD-R, a digital versatile disk (DVD), a USB medium, or a flash memory.

Further, the program to be executed by the mobile systems according to the first to third embodiments may be offered by being stored in a computer connected to a network such as the Internet and downloaded over a network.

In the description of the flowcharts in the present specification, the order of processes in steps has been explained by using expressions such as "first", "then", and "subsequently", but the order of processes necessary for implementing the present embodiment is not uniquely defined by these expressions. That is, the order of processes in the flowchart described in the present specification can be changed unless inconsistency occurs.

According to an embodiment, it is possible to obtain an effect that an operation can be performed in consideration of a user's behavior at a destination.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising a processor configured to:
   acquire a user's destination;
   estimate a user's staying time at the destination based on the destination; and
   determine whether to move a moving body used by the user based on the staying time, after the moving body arrives at the destination by:
   determining whether the staying time is within a predetermined time;
   when the staying time is within the predetermined time, make the moving body wait at the destination after the moving body arrives at the destination; and
   when the staying time is not within the predetermined time,
   determine whether power of a rechargeable battery of the moving body is insufficient based on a remaining battery level and the required power, and determine whether the moving body is chargeable to the required power at the charging place within the staying time when the power of the rechargeable battery is insufficient, and control driving of the moving body by moving the moving body to a charging place to charge the rechargeable battery when the moving body is chargeable to the required power at the charging place within the staying time, and moving the moving body to the destination within the staying time and making the moving body wait at the destination.

2. The server according to claim 1, wherein the processor is configured to:

output information indicating that the moving body has been moved to the charging place to a communication terminal possessed by the user in a case where the moving body is moved to the charging place.

3. The server according to claim 1, wherein the processor is configured to:

dispatch another moving body to the destination in a case where the moving body is moved to the charging place.

4. The server according to claim 1, wherein the processor dispatches another moving body to the destination in a case where the moving body is not chargeable to the required power at the charging place within the staying time.

5. The server according to claim 1, further configured to determine whether the moving body is chargeable to the required power at the charging place within the staying time by:

determining a charging time based on a charging method of the charging device, and determining a time required by the moving body to travel to the charging place and return to the destination.

6. A mobile system comprising:

a moving body having a rechargeable secondary battery; and a server having a processor configured to:

acquire a user's destination;

estimate a user's staying time at the destination based on the destination;

determine whether to move the moving body based on the staying time, after the moving body arrives at the destination by:

determining whether the staying time is within a predetermined time;

when the staying time is within the predetermined time, make the moving body wait at the destination after the moving body arrives at the destination; and when the staying time is not within the predetermined time, determine whether power of the rechargeable secondary battery is insufficient based on a remaining battery level and the required power, and determine whether the moving body is chargeable to the required power at the charging place within the staying time when the power of the rechargeable secondary battery is insufficient, and control driving of the moving body by moving the moving body to a charging place to charge the rechargeable secondary battery when the moving body is chargeable to the required power at the charging place within the staying time, and moving the moving body to the destination within the staying time and make the moving body wait at the destination.

7. The mobile system according to claim 6, wherein the processor is configured to:

output information indicating that the moving body has been moved to the charging place to a communication terminal possessed by the user in a case where the moving body is moved to the charging place.

8. The mobile system according to claim 6, wherein the processor is configured to:

dispatch another moving body to the destination in a case where the moving body is moved to the charging place.

9. The mobile system according to claim 6, wherein the processor dispatches another moving body to the destination in a case where the moving body is not chargeable to the required power at the charging place within the staying time.

10. The mobile system according to claim 6, wherein the processor is further configured to determine whether the moving body is chargeable to the required power at the charging place within the staying time by:

determining a charging time based on a charging method of the charging device, and determining a time required by the moving body to travel to the charging place and return to the destination.

11. A non-transitory computer-readable recording medium storing a program for causing a processor to:

acquire a user's destination;

estimate a user's staying time at the destination based on the destination;

determine whether to move a moving body used by the user based on the staying time, after the moving body arrives at the destination by:

determining whether the staying time is within a predetermined time;

when the staying time is within the predetermined time, make the moving body wait at the destination after the moving body arrives at the destination; and when the staying time is not within the predetermined time, determine whether power of a rechargeable battery of the moving body is insufficient based on the remaining battery level and the required power, and determine whether the moving body is chargeable to the required power at the charging place within the staying time when the power of the rechargeable battery is insufficient, and control driving of the moving body by moving the moving body to a charging place to charge the rechargeable battery when the moving body is chargeable to the required power at the charging place within the staying time, and move the moving body to the destination within the staying time and make the moving body wait at the destination.

12. The non-transitory computer-readable recording medium storing the program according to claim 11, wherein the program causes the processor to:

output information indicating that the moving body has been moved to the charging place to a communication terminal possessed by the user in a case where the moving body is moved to the charging place.

13. The non-transitory computer-readable recording medium storing the program according to claim 11, wherein the program causes the processor to:

dispatch another moving body to the destination in a case where the moving body is moved to the charging place.

14. The non-transitory computer-readable recording medium storing the program according to claim 11, wherein the program causes the processor to determine whether the moving body is chargeable to the required power at the charging place within the staying time by:
   determining a charging time based on a charging method of the charging device,
   determining a time required by the moving body to travel to the charging place and return to the destination.

* * * * *